US011376796B2

(12) United States Patent
Roca Vila et al.

(10) Patent No.: US 11,376,796 B2
(45) Date of Patent: Jul. 5, 2022

(54) ADAPTING PRINTING PARAMETERS DURING ADDITIVE MANUFACTURING PROCESSES

(71) Applicant: HEWLETT-PACKARD DEVELOPMENT COMPANY, L.P., Spring, TX (US)

(72) Inventors: Jordi Roca Vila, Sant Cugat del Valles (ES); Sergio Gonzalez Martin, Sant Cugat del Valles (ES); Daniel Mosher, Corvallis, OR (US); David A. Champion, Corvallis, OR (US); Jun Zeng, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,033

(22) PCT Filed: Jul. 23, 2018

(86) PCT No.: PCT/US2018/043310
§ 371 (c)(1),
(2) Date: Oct. 17, 2019

(87) PCT Pub. No.: WO2020/023010
PCT Pub. Date: Jan. 30, 2020

(65) Prior Publication Data
US 2021/0331406 A1    Oct. 28, 2021

(51) Int. Cl.
*B33Y 50/02* (2015.01)
*B29C 64/393* (2017.01)
(Continued)

(52) U.S. Cl.
CPC .......... *B29C 64/393* (2017.08); *B29C 64/165* (2017.08); *B33Y 10/00* (2014.12); *B33Y 50/02* (2014.12)

(58) Field of Classification Search
CPC ...................................................... B33Y 50/02
(Continued)

(56) References Cited

U.S. PATENT DOCUMENTS 10,449,722 B2 * 10/2019 Sanz Ananos ......... B33Y 10/00
2015/0266242 A1    9/2015 Comb et al.
(Continued)

FOREIGN PATENT DOCUMENTS

CN    107206536 A    9/2017
JP    2012-040757 A   3/2012
(Continued)

*Primary Examiner* — Suresh Suryawanshi
(74) *Attorney, Agent, or Firm* — Fabian VanCott

(57) ABSTRACT

A printing device for adapting a printing parameter in relation to the height of a layer of material deposited during an additive manufacturing process is disclosed. The printing device comprises a printing component to deposit a layer of material that is to be solidified so as to form at least a portion of an object, a controller to determine the height of the layer of material at various positions across the layer and to select voxels of a data model of the object, the selected voxels correspond to the height of the layer of material at said various positions, and the controller is further to use the selected voxels as input for calculating a printing parameter.

20 Claims, 7 Drawing Sheets

(51) Int. Cl.
*B29C 64/165* (2017.01)
*B33Y 10/00* (2015.01)

(58) Field of Classification Search
USPC .......................................................... 700/118
See application file for complete search history.

(56) References Cited

U.S. PATENT DOCUMENTS

| | | | |
|---|---|---|---|
| 2015/0352839 A1* | 12/2015 | Folkins | B33Y 50/02 |
| | | | 347/14 |
| 2016/0311184 A1 | 10/2016 | Gourraud | |
| 2017/0021569 A1 | 1/2017 | Aramendia et al. | |
| 2017/0056967 A1 | 3/2017 | Fulop et al. | |
| 2017/0210075 A1* | 7/2017 | Sanzananos, Jr. | B33Y 30/00 |
| 2017/0277168 A1 | 9/2017 | Tanaka et al. | |
| 2018/0029300 A1* | 2/2018 | Batchelder | B33Y 30/00 |
| 2018/0050492 A1 | 2/2018 | Sanz Ananos et al. | |
| 2018/0099333 A1 | 4/2018 | DehghanNiri et al. | |
| 2020/0189200 A1* | 6/2020 | Mosher | B22F 10/20 |
| 2020/0238625 A1* | 7/2020 | Champion | B29C 64/393 |

FOREIGN PATENT DOCUMENTS

| | | | |
|---|---|---|---|
| WO | WO2015091813 A1 | 6/2015 | |
| WO | WO2018017099 A1 | 1/2018 | |

\* cited by examiner

ADAPTING PRINTING PARAMETERS DURING ADDITIVE MANUFACTURING PROCESSES

BACKGROUND

Additive manufacturing techniques are used for generating a three-dimensional object on a layer-by-layer basis through the incremental addition of a build material such as a powder. In examples of additive manufacturing, layers of powder are deposited on top of each other, and after each layer has been deposited a construction operation is performed so as to cause the powder to fuse or bind in selected regions. The construction operation may include, heating, application of binding materials, or chemical solidification methods.

In order to print a three-dimensional object, a computer model of the object to be printed may be used so that the additive manufacturing apparatus can determine various parameters including where to apply binding materials. In some examples, more than one object may be generated at once.

BRIEF INTRODUCTION OF THE DRAWINGS

DETAILED DESCRIPTION

Figure 1:
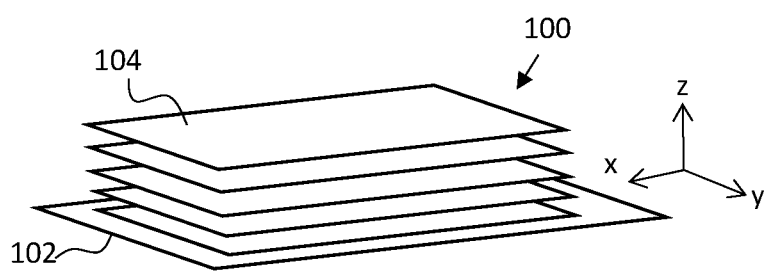
FIG. 1 is a schematic diagram illustrating deposition of layers of build material in an additive manufacturing process.

Additive manufacturing techniques may be used for producing a three-dimensional object. It may involve depositing or spreading a layer of a build material on a print bed within a fabrication chamber, solidifying the build material in selected regions, and then dropping the print bed within the fabrication chamber so that a new layer of build material can be deposited on top of the solidified or fused layer of build material and then solidifying the new layer in the selected regions. This process is repeated until the three-dimensional object has been built or printed. Thereafter, excessive build material that has not been solidified is removed such that the remainder solidified build material is the desired three-dimensional object.

The build material, also referred to as "material" herein, used for building or printing a three-dimensional object may be for example, a plastic, ceramic or metal powder. The powder can be of various coarseness. Each layer of build material may be approximately 80 microns (micrometers) in thickness or height. As the additive manufacturing processes operate at such small scales, a layer of build material may not have a uniform height, instead it may have regions of a greater or smaller height. Thus, in the example where the layer of build material has a height of 80 microns, there may be regions that have a height greater than 80 microns and regions that have a height smaller than 80 microns. Thus, the layer of build material can be considered to be non-planar.

Construction operations (also referred to as solidification methods) may be directional application of energy, for example using a laser or electron beam which solidifies the build material where it has been applied. In another example, where the build material is a resin, the solidification method may involve application of light in order to cure or solidify the build material in selected areas.

In other examples, at least one print agent can be applied to a layer of material in order to solidify the layer in the selected regions. A print agent may be a fusing agent (also known as a coalescence agent or coalescing agent). In one example, the fusing agent is a liquid when applied to the layer of material, and depending on its composition it may absorb energy such that, when heat is applied to the layer, the selected regions to which a fusing agent has been applied coalesces and solidifies. In other examples, a print agent may also include a detailing agent. A detailing agent (also referred to as a coalescence modifying agent) acts to modify the effects of a fusing agent, for example, by reducing or increasing coalescence or to assist in producing a particular finish or appearance of an object. A colouring agent may also be added to the build material so as to provide a colour to the object. The colouring agent may also act as a fusing or detailing agent.

Additive manufacturing systems may generate three-dimensional objects based on a three-dimensional computerised data model. A three-dimensional data model may be prepared using a computer program such as a computer aided design (CAD) application. The data model represents structural design data and provides an additive manufacturing apparatus performing the printing or building of the object with details of all the relevant parameters including number of layers of material, solidification method and its parameters, information of areas selected for solidification, cooling rate and time. The data model can be processed to generate slices of parallel planes of said model. Each slice corresponds to a layer of material, such that each slice defines the parameters previously discussed for the respective layer of material. Thus, as a layer is deposited on the print bed the additive manufacturing system applies the parameters in accordance with the information of the corresponding slice.

A data model may also be processed such that it is represented by voxels. Voxels can be described as three-dimensional pixels, and a layer of voxels can be considered as a slice as described above such that each voxel is associated with the parameters of that layer.

In some examples set out herein, it may be intended to build or print a number of objects in a single build process. This may for example increase the throughput of an additive manufacturing apparatus and increase energy efficiency.

Referring now to the drawings.

The description and drawings refer to x, y and z-directions. These directions are to be understood to take their normal meaning, however for the sake of clarification FIG. 1 illustrates how layers of build material 104 are deposited on a print bed 102 across the plane defined by the x, y directions, and stacked on top of each other in the z-direction. The height (which may also be considered as the thickness) of each layer extends in the z-direction. As described above, the height may vary across each layer of build material, such that at a first position $(x_1, y_1)$ of a first layer the height may be different to the height of a second position ($x_2$, $y_2$) of the same layer. Thus, each layer may be considered to be non-uniform or non-planar.

Figure 2:
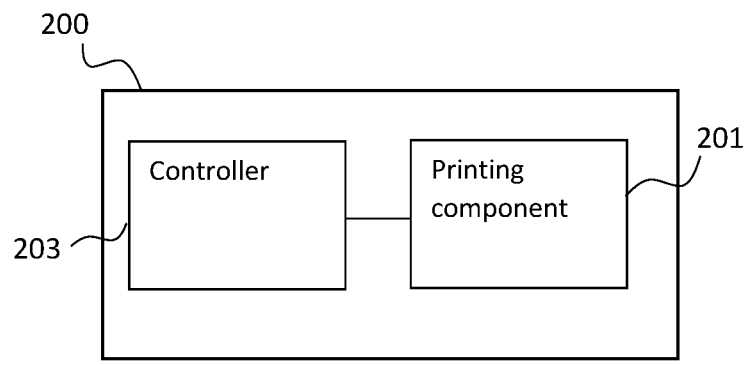
FIG. 2 is a schematic diagram illustrating an example apparatus for adapting a printing parameter.

FIG. 2 is a schematic diagram illustrating an example apparatus 200 to implement examples described herein. The apparatus 100 may be a printing device. The apparatus 200 is for adapting or adjusting a printing parameter in relation to the height of a layer of material deposited during an additive manufacturing process, so as to take into account the non-planar characteristics of a layer of material. This means that a printing parameter or several printing parameters can be tailored to the varying height of the layer of material which will result in an object with more uniform thermal and mechanical characteristics. Examples of a printing parameter may be an amount of a fusing agent, a detailing agent, and/or energy such as heat or light. Other examples of a printing parameter include the type or kind of a fusing agent, and/or detailing agent, and/or energy. A colour agent is another example of a printing parameter. The examples of printing parameters are applicable to all of the apparatus and methods described herein.

The apparatus 200 comprises a printing component 201 to deposit or spread a layer of material that is to be solidified or fused so as to form at least a portion of an object that is to be manufactured or printed. The apparatus further comprises a controller 203 to determine the height of the layer of material at various positions across the layer. The controller 203 is further to select voxels of a data model of the object that is to be manufactured. The selected voxels correspond to the height of the layer of material at the various positions. The controller is further to use the selected voxels as input for calculating a printing parameter.

Figure 3:
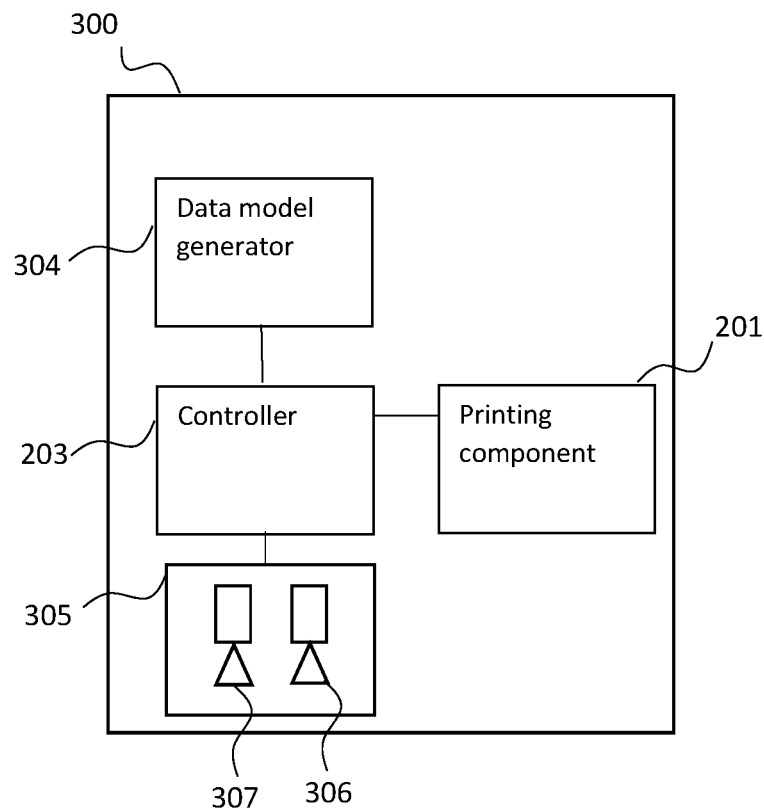
FIG. 3 is a schematic diagram illustrating another example apparatus for adapting a printing parameter.

FIG. 3 is a schematic diagram illustrating an example apparatus 300 comprising the controller 203 and the printing component 201 described above. The controller may comprise a processor and internal and/or external memory storing instructions and data, including the information for generating a three-dimensional data model, voxelising a three-dimensional data model, selecting voxels of the data model that correspond to the height of the layer of material at said various positions, and to use the selected voxels as input for calculating a printing parameter.

The apparatus 300 may further comprise a data model generator 304 for generating a three-dimensional data model of an object to be manufactured, wherein said data model comprises voxels. Thus, the data model generator can generate a three-dimensional data model and then voxelise the data model such that the data model is represented by voxels, this may be referred to as a "build voxelisation". In another example, the data model generator 304 receives a three-dimensional model from an external device, for example, a computer, and the data model generator voxelises the received three-dimensional model. The data model generator 304 may comprise a processor and internal and/or external memory storing instructions and data, including information on how to generate a three-dimensional data model and/or how to voxelise a three-dimensional data model. Alternatively, the data model generator may comprise a set of instructions stored in the memory of the controller 203 and executable by the processor of the controller 203 so as to achieve any of the aforementioned examples. In yet another example, the apparatus 300 does not comprise a data model generator, nor does the memory of the controller 203 store a set of instructions, instead the controller 203 receives instructions for an already voxelised data model from an external device.

The controller 203 may select voxels of the voxelised data model that correspond to the height of the layer of material at various positions. These positions are different locations or coordinates in the x, y plane. In one example, the height of the layer of material is determined at several positions such that it can be considered that the height of the layer is measured continuously across said whole layer or a region of a layer. In another example, the controller 203 may select voxels based on the location of the voxels in the data model with respect to the height of the layer of material at the various positions. In yet another example, the height of the layer of material may be a range and the controller 203 may select the voxels that fall within the range of the height of the layer of material at said various positions.

An example of how the above described examples in relation to selecting voxels can be implemented, will now be described. A voxelised data model is generated wherein each voxel is 10 microns in height (z-direction). If there is a desire or need to adapt the printing parameters of a layer of material within a range of −160 microns to +160 microns then a corresponding stack of voxels would comprise of 32 voxels, wherein the first voxel is mapped to −160 microns to −150 microns and the $32^{nd}$ voxel is mapped to +150 microns to +160 microns. Then, for the location in terms of x, y coordinates of every voxel, or every stack of voxels, the height of the layer of material at the corresponding location (x, y coordinates) is determined. For example, at a location with $x_i$, $y_i$ coordinates, a height of the layer of material deposited has been determined as 120 microns. This height may range from −40 to +80 microns relative to a predetermined plane considered as zero. The controller then locates the same corresponding coordinate or location in the voxelised data model (build voxelisation), and from the stack of voxels for this location voxels from positions 13 to 23 are selected. Thus, for every location a subset of voxels is selected from the original stack of 32 voxels. This example assumes that the height of the material does not exceed 320 microns, however should that be the case, then a greater range needs to be set, for example −200 microns to +200 microns and a corresponding stack of 10 micron voxels would comprise 40 voxels.

As described above, the height of the voxels can be set during voxelisation and so in some data models they may have a greater height and in other data models they may have a smaller height. In one example, the height of each voxel can be less than the height of the layer of material such that at least two voxels, or a range of voxels correspond to the height of the layer material at the various positions. In another example, the height of each voxel can be set to be less than the height of the layer of material such that at least eight voxels correspond to the height of the layer material at various positions. The smaller the height of the voxels the greater the number of voxels in a stack, resulting in more finetuned tailored printing parameters.

It should be understood that voxels are selected for each layer of material deposited during the additive manufacturing process, such that the object of the data model is gradually built layer by layer with at least one tailored printing parameter for each layer and at each position of each layer.

The selected voxels may be used as input for calculating a printing parameter at each position. In one example, a printing parameter may be determined using contone images. Contone images are grayscale images which represent the amount of print agent (e.g. fusing agent and detailing agent) to be deposited on the layer of material to solidify or fuse selected regions in order manufacture the object of the data model. Thus, the selected voxels may be used for calculation of a printing parameter so that said printing parameter applied during solidification of the layer of material can be adapted to the height of said layer of material at various positions. For example, if at a position of a layer of material, the height expected is 80 microns, however the actual height is 120 microns, the corresponding voxels which are selected by the controller can be evaluated and used as input for calculating a printing parameter. It should be understood that if the height of the layer of material was 80 microns, then fewer voxels would have been selected.

By selecting voxels for each layer of material deposited, an adapted or bespoke printing parameter for the corresponding position or location of the layer of material can be applied. The examples described herein allow for a printing parameter to be adapted dependent on the height of the layer of material, and as another layer is deposited, another set of voxels are selected, and a printing parameter is determined accordingly. Thus, for each layer, and across each layer, a printing parameter is adapted such that the examples described herein can be considered to comprise an online or inline feedback system. As a printing parameter can be adapted to the height of the layer of material, the final object will comprise more uniform thermal and mechanical characteristics across the whole object. For example, a manufactured object according to the examples herein, may have fewer areas of localised stress. In summary, the examples provided herein can achieve a greater accuracy when manufacturing objects using additive manufacturing methods.

In order to determine the height of a layer of material at various positions, the apparatus 300 may further comprise a camera system 305. The camera system 305 may comprise two cameras 306, 307, wherein each camera is viewing the layer of material from different vantage points. From the output of these cameras, together with triangulation using disparity measurements and known system geometry, the controller may calculate the height of the layer of material at various positions, and then reconstruct a three-dimensional representation or range image of the surface of the layer of material. The range image of the layer of material will give the height of not just the latest deposited layer, but the height of the whole object, i.e. of all previously deposited layers, and so in order to calculate the actual height of the latest deposited layer of material, the range image or the height of the previously deposited layer of material is subtracted from the range image or the height of the latest deposited layer of material.

The controller 203 may also determine densification of a layer of material, meaning that the controller is to determine how much the spatially resolved density changes in a layer of material as a result of solidification. It is expected that selected regions where a solidification process has been applied will be more dense than non-treated areas. The controller 203 may determine densification using output from the camera system 305. In one example, the apparatus is to measure the height of the solidified layer of material at said various positions, and the controller is then to determine the densification of the layer of material by identifying the difference in height of the layer of material before and after solidification at said various positions. This may be implemented by the printing device generating a range image of the layer of material as described above. The printing device may then solidify the layer of material in at least one selected region, and then generate a second range image of the layer of material and identify the difference between the two range images so as to establish densification of the layer of material.

The apparatus may further comprise a solidification component that is to implement an adapted printing parameter by solidifying selected regions of the layer of material before the next layer of material is deposited. The solidification component may solidify the selected regions by application of a fusing or detailing agent, heat or light.

Figure 4:
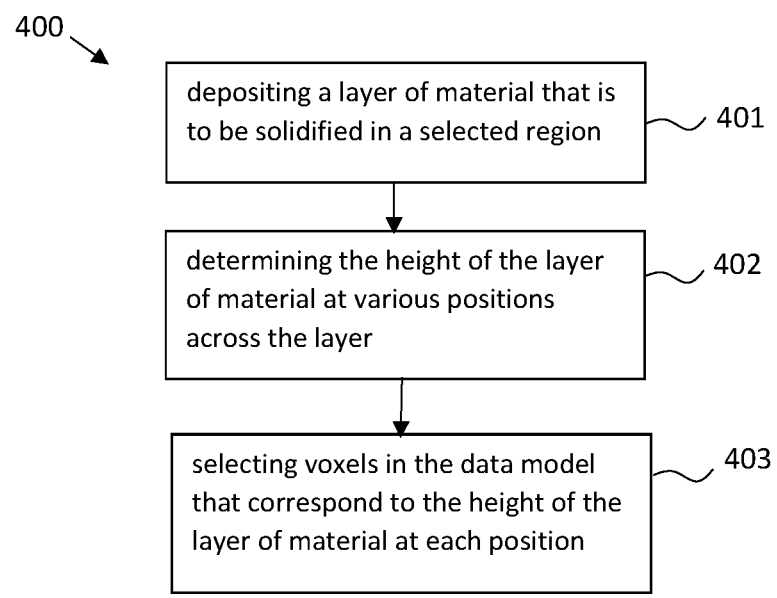
FIG. 4 is an example flowchart of a method for adapting a printing parameter.

FIG. 4 illustrates an example flowchart of a method 400 for adapting or adjusting a printing parameter in relation to the height of a layer of material deposited or spread during an additive manufacturing process. The method comprises, depositing a layer of material that is to be solidified in a selected region, operation 401. In the next operation, 402, the method comprises determining the height of the layer of material at various positions across the layer and then at operation 403, selecting voxels in the data model that correspond to the height of the layer of material at each position, the selected voxels are for use as input for calculating a printing parameter. Examples of a printing parameter discussed in connection with FIG. 2, is also applicable for this method 400.

In one example of the method 400, the operation of selecting the voxels is based on the location of the voxels in the data model with respect to the height of the layer of material at said various positions. In another example, the height of the layer of material is a range and the operation of selecting the voxels comprises selecting voxels that fall within the range of the height of the material at each position. In both these examples, voxels of the data model extend in the z-direction and a stack of voxels corresponding to the specific height or range determined at a particular position are selected. In another example, the voxels are of a height that is less than the height of the layer of material deposited during the additive manufacturing period, such that at least two voxels correspond to the height of the layer of material at said various positions.

The method 400 may further comprise the operation of determining the height of the layer of material by depositing an initial or first layer of material on a print bed. (The initial layer may be a first layer directly deposited on the print bed, or it may be a layer deposited on a previously deposited layer of material). The method further comprises solidifying at least one selected region of the initial layer and then measuring the height of said initial layer. As a next operation, a subsequent layer of material is deposited and its height is measured relative to the print bed. To determine the height of the subsequent layer, the height of the initial layer measured at each position is subtracted from the height of the subsequent layer at corresponding positions. It should be understood that the method 400 can implement any of the alternatives of the apparatus 300.

Examples of how to the above apparatuses and methods can be implemented will now be described.

Figure 5:
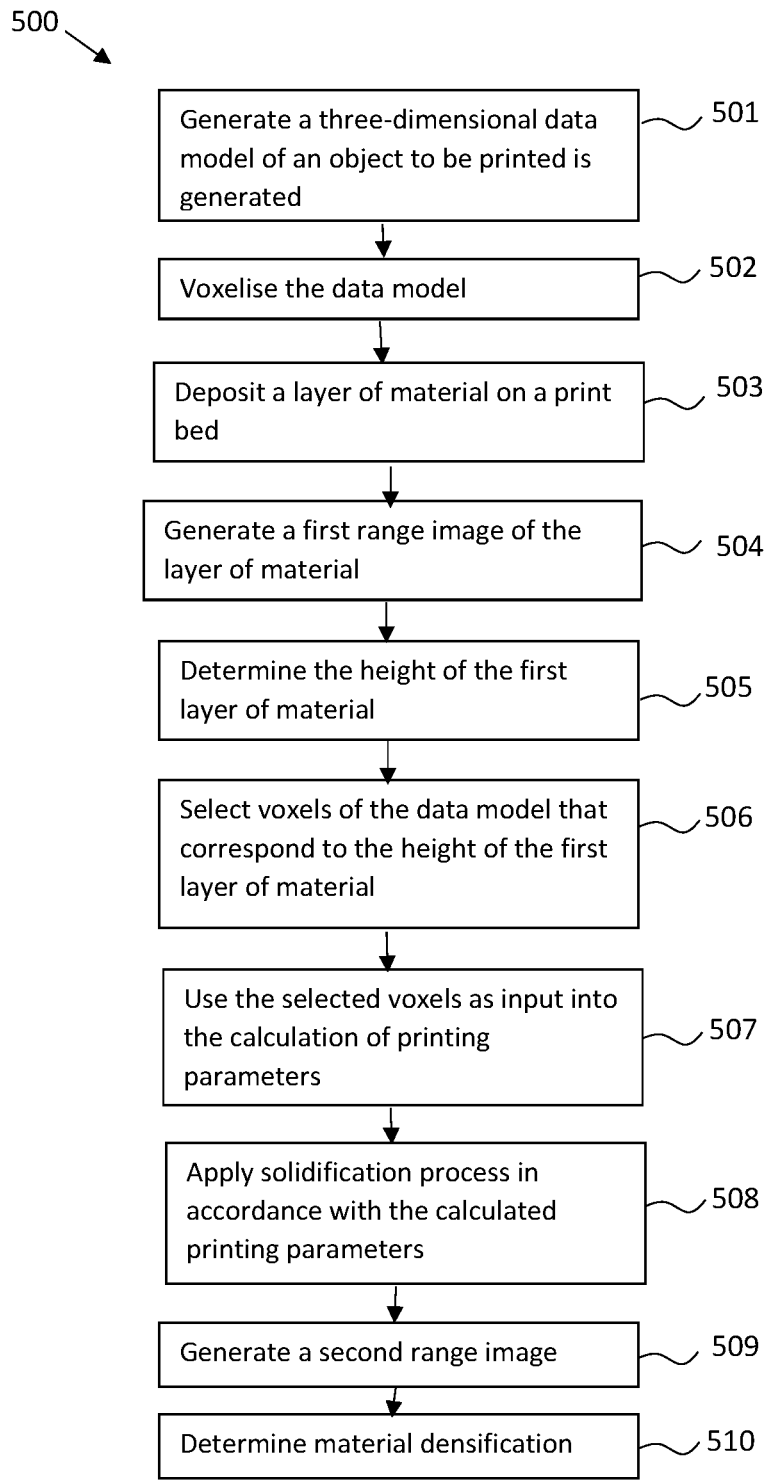
FIG. 5 is an example flowchart of another method for adapting a printing parameter.

Referring to FIG. 5, an example of a method 500 for adjusting or adapting a printing parameter in relation to the height of a layer of material deposited during an additive manufacturing process is shown. Similar to the above examples, the height is to be understood to be in the z-direction.

In operation 501, a data model is generated which is a three-dimensional representation of the object to be printed. The generation of the data model may comprise any of the following operations; loading, fixing, hollowing, caging, adding lattices, textures labelling, support structures, making colour adjustments, packing and then slicing where the data model is sliced into planes parallel to the planes of an x, y axes. The three-dimensional representation of the object is then formatted for the next processing operation.

In operation 502, the data model is voxelised, meaning that data model is processed such that it is represented by voxels. The number of voxels in the height direction (z-direction) can be varied and it may be set so that at least two voxels in the height direction fall within the height of a slice generated in the previous operation. In one example, the number of voxels in the height direction is set so that at least two voxels will correspond or fall within the height of a predicted layer of material.

In operation 503, a first layer of material is deposited on a print bed.

In operation 504, a first range image of the first layer of material is generated. The range image can be generated using a camera system as described above with reference to FIG. 3. The representation of the surface of the deposited layer of material will show that the layer of material is uneven, i.e. it is not planar. The range image may be denoted as $L^1_{PD}$ and it represents the varying height of the first layer of material in relation to the print bed. For $L^1_{PD}$, the number "1" indicates that it is the first layer of material, and PD (powder deposition) signifies that powder has been deposited.

In operation 505, the height of the first layer of material is determined. As this is the first layer deposited on the print bed, and the print bed is considered to correspond to "zero" height, the height determined in operation 504 is considered to be the actual height of the layer of material.

In operation 506, voxels of the data model corresponding to the height of the layer of material is selected. In other words, a layer of voxels of the data model that corresponds to the first layer of material is selected, such that for a first position where the height of the layer of material is higher than a second position, more voxels in the z-direction is selected for said first position than for said second position. This means that the selected voxels form a surface which correspond to the surface of the layer of material deposited. Thus, the layer of voxels may have varying number of voxels in the z-direction, as it depends on the varying height of the first layer of material.

In operation 507, the selected voxels are used as input into the calculation of at least one printing parameter for each position. This means that a printing parameter can be adjusted or tailored to the varying height of the first layer. In one example, the selected voxels are used as input to generate contone images.

In operation 508, a solidification process is applied in accordance with the printing parameter(s) calculated in operation 507. The solidification process solidifies the layer of material in at least one selected region. As described above, solidification can be achieved by the use of a print agent such as fusing agent and/or detailing agent. Colouring agent may also be added at this stage.

In operation 509, a second range image of the first layer of material is generated using the above mentioned camera system. The second range image is denoted $L^1_{PS}$, wherein 1 represents the first layer and PS represents post solidification.

In operation 510, material densification is determined by establishing the difference between the first range image ($L^1_{PD}$) and the second range image ($L^1_{PS}$).

Figure 6:
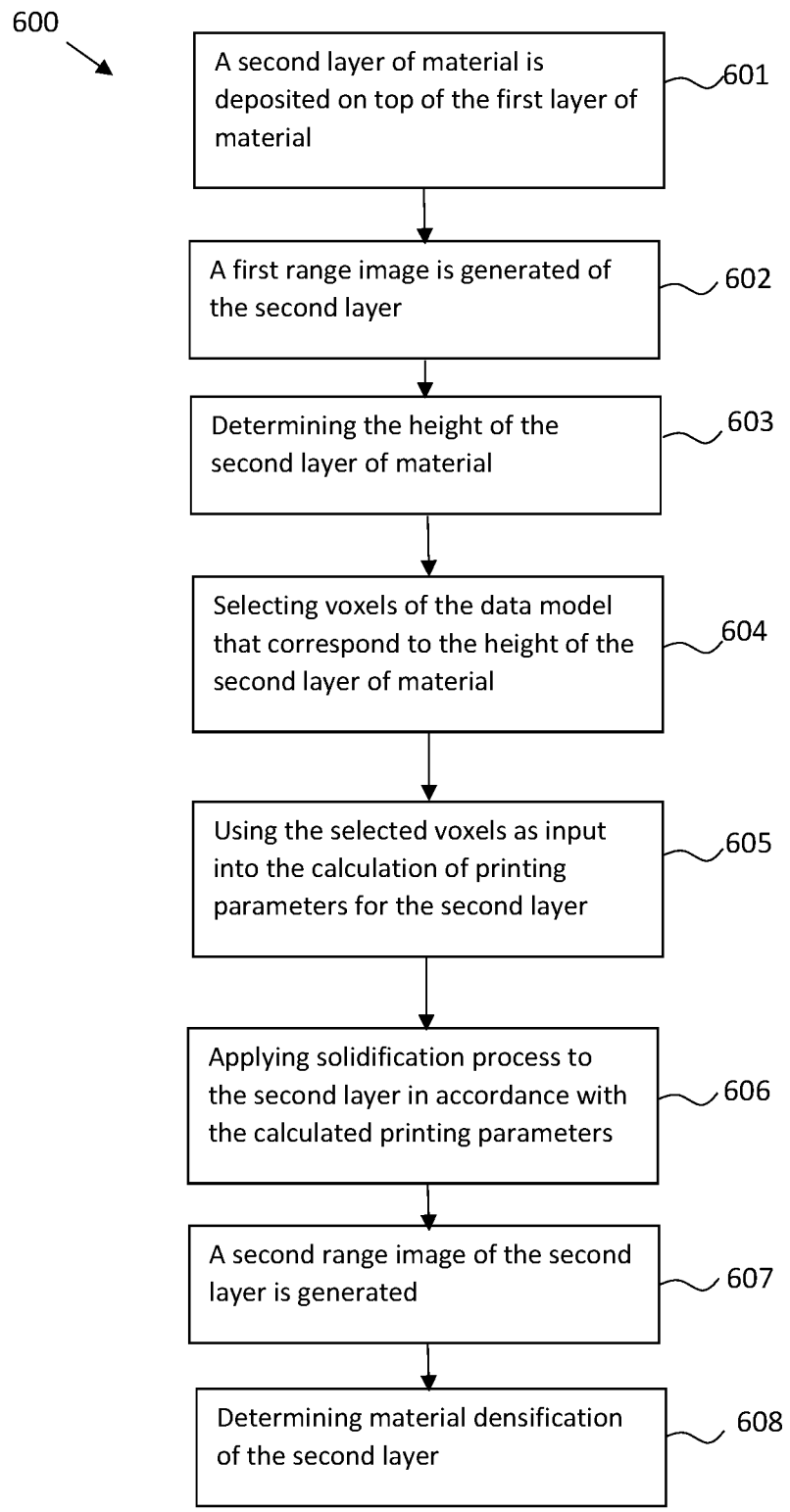
FIG. 6 is an example flowchart of yet another method for adapting a printing parameter.

Another example of a method 600 will now be described with reference to FIG. 6. This method describes the deposition and solidification of all consecutive layers of material following the deposition of the first layer shown in FIG. 2, thus the method in FIG. 6 can be considered to be a continuation of the method described with reference to FIG. 5.

In a first operation 601, a second layer of material is deposited on top of the first layer.

In a next operation 602, a first range image ($L^2_{PD}$) of the second layer of material is generated using the camera system described with reference to FIG. 2. The range image gives the varying height of the second layer of material in relation to the print bed. For $L^2_{PD}$, the number "2" indicates that it is the second layer of material, and PD signifies powder deposition.

In operation 603, the height of the second layer of material is determined. The height of the second layer of material is to be determined relative to the first layer and not the print bed, therefore by subtracting information in the second range image of the first layer of material after solidification ($L^1_{PS}$) from information in the first range image ($L^2_{PD}$) of the second layer the height of the second layer of material can be established. This can be summarised as $$I^2 = (L^2_{PD}) - (L^1_{PS})$$

wherein $I^2$ is the height of the second layer of material.

In operation 604, voxels of the data model corresponding to the height of the layer of material is selected similar to operation 506. In other words, a layer of voxels of the data model that corresponds to the second layer of material is selected, such that for a first position where the height of the layer of material is higher than a second position, more voxels in the z-direction is selected for said first distinct position than for said second position. Thus, the layer of voxels may have varying number of voxels in the z-direction, as it depends on the varying height of the first layer of material. In an alternative explanation, the voxels of the data model that are selected are those voxels that fall between the surface of the first layer and the surface of the second layer.

The selected layer of voxels (LV) for the second layer can be described as:

$$LV^2 = \varphi(I^2, BV)$$

wherein $\varphi$ represents an operation, $I^2$ is the height of the second layer determined in operation 603, and BV is the build voxelisation or more specifically the voxelised data model generated in operation 502. An example of an operation can be to determine an intersection or overlap of I and BV, meaning that the voxels identified and forming a layer, are those voxels occupying a space or location in the data model that correspond to the layer material height.

In operation 605, the selected voxels are used as input into the calculation of at least one printing parameter for each position. This means that a printing parameter can be adjusted in relation to the varying height of the second layer of material, or more specifically a printing parameter can be adapted to the specific height of the material at each position.

In operation 606, a solidification process is applied in accordance with the printing parameter calculated in operation 605. The solidification process solidifies the second layer of material in at least one selected region in accordance with the data model. As described above, solidification can be achieved by the use of a print agent such as fusing agent and/or detailing agent. A colouring agent may also be added at this stage.

In operation 607, a second range image of the second layer of material is generated using the above mentioned camera system. The second range image is denoted $L^2_{PS}$, wherein 2 represents the second layer and PS represents post solidification.

In operation 608, material densification of the second layer is determined by establishing the difference between the first range image ($L^2_{PD}$) and the second range image ($L^2_{PS}$) of the second layer.

The method 600 is then repeated for each layer of material deposited such that; the height of each layer can be summarised as $I^i=(L^i_{PD})-(L^{i-1}_{PS})$ wherein "i" stands for the number of layer, and the selected layer of voxel (LV) based on the height ($I^i$) of a layer and the voxelised data model (BV) can be summarised as $LV^i=\varphi(I^i, BV)$, wherein $\varphi$ stands for an operation as discussed above.

Figure 7:
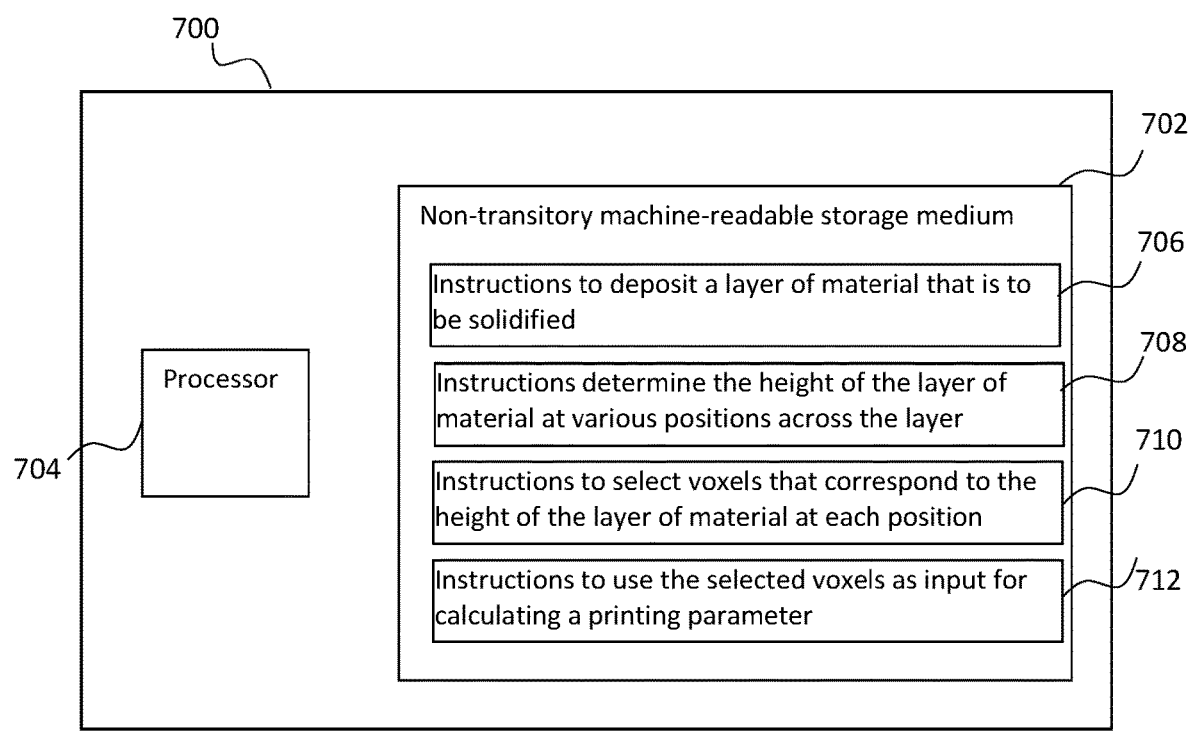
FIGS. 7 and 8 are example schematic diagrams illustrating the components of a storage medium accessible by a processor.

The methods 400, 500, 600 described above may be computer-implemented. FIG. 7 illustrates an apparatus 700 comprising a non-transitory machine-readable storage medium 702 accessible by a processor 704 to carry out the above described methods according to an example. The processor and the machine-readable storage medium may form part of the controller described above with respect to, for example, FIGS. 2 and 3. The non-transitory machine-readable storage medium 702 is encoded with instructions that are executable by the processor 704. The instructions comprise instructions 706 to deposit a layer of material that is to be solidified. The instructions also comprise instructions 708 to determine the height of the layer of material at various positions across the layer. Furthermore, the instructions also comprise instructions 710 to select voxels in the data model that correspond to the height of the layer of material at each position. The instructions also comprise instructions to use the selected voxels as input for calculating a printing parameter 712. The storage medium may include any combination of suitable volatile memory and/or non-volatile memory, including, but not limited to, read-only memory (ROM), random access memory, cache, buffers, etc. Although a single processor is shown, the storage medium may be shared among various processors or dedicated to particular processors. The storage medium may also comprise additional instructions and data for carrying out the method described.

Figure 8:
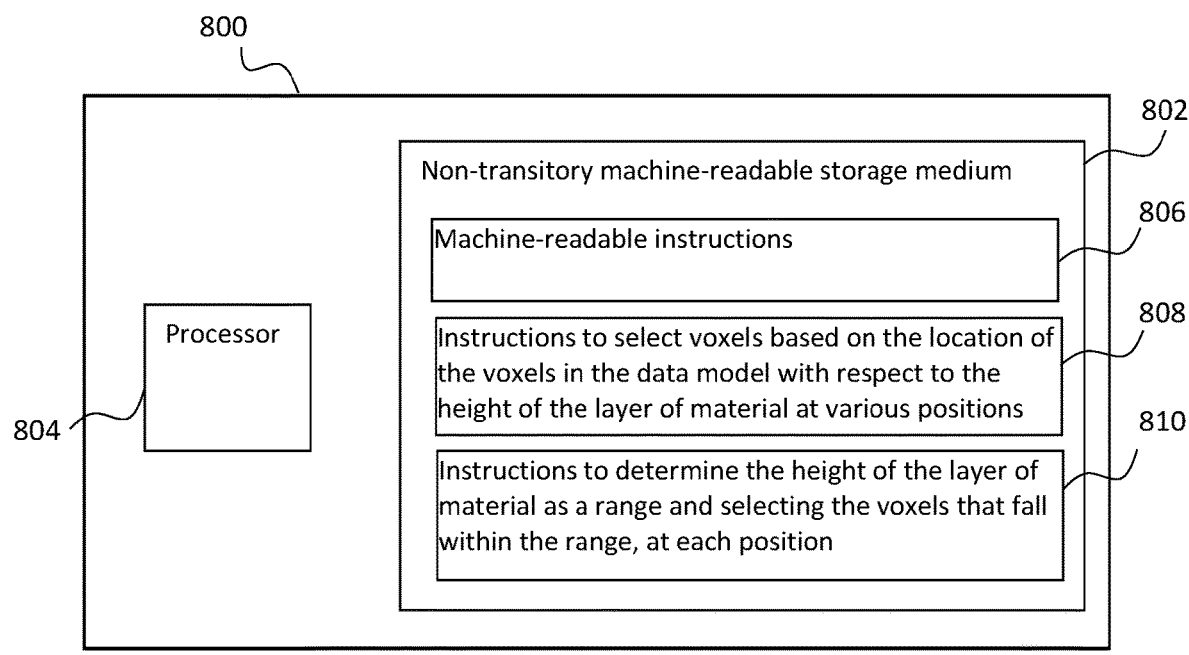

FIG. 8 shows another example of an apparatus 800 comprising a non-transitory machine-readable storage medium 802, accessible by a processor 804 for implementing the methods described above, comprising additional data and instructions. Non-transitory machine-readable storage medium 802 is encoded with instructions that are executable by the processor 804. The storage medium may be the storage medium of FIG. 7 but, in addition to instructions 806 corresponding to the instructions described with respect to FIG. 7, the non-transitory machine readable storage medium 802 may also comprise, for example, instructions to select voxels based on the location of the voxels in the data model with respect to the height of the layer of material at various positions, 808. The transitory machine-readable storage medium 802 may further comprise instructions 810 to determine the height of the layer of material as a range and to select the voxels that fall within the range, at each position. The storage medium may not store all the instructions and data described above and it may also store additional instructions and data.

The above described examples of apparatus and methods allow for a printing parameter to be adapted dependent on the height of the layer of material. The printing parameter is not just adapted to each layer, but also to each position or coordinate of each layer. As the adaption or tailoring occurs during the additive manufacturing process the examples described herein can be considered to comprise an online or inline feedback system. As a printing parameter can be adapted to the height of the layer of material, the final object will comprise more uniform thermal and mechanical characteristics across the whole object. For example, a manufactured object according to the examples herein, may have fewer areas of localised stress. In summary, the examples provided herein can achieve a greater accuracy when manufacturing objects using additive manufacturing methods.

The description of the various aspects and examples of the present disclosure has been presented for purposes of illustration and description, but is not intended to be exhaustive or to limit the disclosure to the forms disclosed. Any example of a feature or alternative described herein may be combined with any other example of a feature and alternative described, as appropriate, and the disclosure includes the various combinations and configurations of examples and alternatives.

The invention claimed is:

1. A printing device for adapting a printing parameter in relation to the height of a layer of material deposited during an additive manufacturing process, the printing device comprising:
   a printing component to deposit a layer of material and selectively solidify only some portions of the material layer so as to form at least a portion of an object;
   a controller to determine the height of the layer of material at various positions across the layer and to select voxels of a data model of the object, the selected voxels correspond to the height of the layer of material at said various positions, and
   the controller is further to use the selected voxels as input for calculating a printing parameter to be used by the printing device when selectively solidifying corresponding portions of the material layer.

2. A printing device according to claim 1, wherein the controller is to select voxels based on the location of the voxels in the data model with respect to the height of the layer of material at said various positions.

3. A printing device according to claim 1, wherein the height of the layer of material is a range and the controller is to select voxels that fall within the range of the height of the layer of material at said various positions.

4. A printing device according to claim 1, wherein the selected voxels are to be used for calculation of a printing parameter so that said printing parameter applied during solidification of the layer of material can be adapted to the height of said layer of material at said various positions.

5. A printing device according to claim 1, wherein the height of each voxel is less than the height of the layer of material such that at least two voxels correspond to the height of the layer material at said various positions.

6. A printing device according to claim 1, wherein the printing device further comprises two cameras to generate a range image of the layer of material so as to determine the height of the layer of material at said various positions.

7. A printing device according to claim 1, wherein the printing device is to solidify the layer of material in at least one selected region and measure the height of the solidified layer of material at said various positions, and the controller is to determine the densification of the layer of material by identifying the difference in height of the layer of material before and after solidification at said various positions.

8. A printing device according to claim 1, wherein a printing parameter comprises a type and/or an amount of a fusing agent and/or a detailing agent, or a type and/or an amount of energy.

9. A method for adapting a printing parameter in relation to the height of a layer of material deposited during an additive manufacturing process, the method comprising:

depositing a layer of material that is to be solidified in a selected region, determining the height of the layer of material at various positions across the layer, and then selecting voxels in the data model that correspond to the height of the layer of material at each position, the selected voxels are for use as input for calculating a printing parameter.

10. A method according to claim 9, wherein selecting the voxels is based on the location of the voxels in the data model with respect to the height of the layer of material at said various positions.

11. A method according to claim 9, wherein the height of the layer of material is a range and selecting the voxels comprises selecting voxels that fall within the range of the height of the material of layer at said various positions.

12. A method according to claim 9, wherein the selected voxels are used for calculation of a printing parameter so that said printing parameter applied during solidification of the layer of material can be adapted to the height of said layer of material at said various positions.

13. A method according to claim 9, wherein the height of each voxel is less than the height of the layer of material such that at least two voxels correspond to the height of the layer of material at said various positions.

14. A method according to claim 9, wherein the height of the layer of material is determined by depositing an initial layer of material on a print bed, solidifying at least one selected region of said initial layer, measuring the height of said initial layer, and then depositing the layer of material and measuring its height relative to the print bed, and subtracting the height of the initial layer of material from the height of the layer of material.

15. A non-transitory machine-readable storage medium encoded with instructions executable by a processor, the machine-readable storage medium comprising:

instructions to deposit a layer of material that is to be solidified so as to form at least a portion of the object, instructions to determine the height of the layer of material at various positions across the layer, and instructions to select voxels in a data model of the object, the selected voxels correspond to the height of the layer of material at said various positions, and instructions to use the selected voxels as input for calculating a printing parameter.

16. The printing device of claim 1, wherein the printing component comprises a powder spreader to spread a layer of powdered build material.

17. The printing device of claim 1, wherein the printing parameter comprises an amount of agent to be applied by the printing component to a particular location on the material layer, the controller to determine the amount of agent to be applied at the particular location depending on the selected voxels of the particular location which are selected corresponding to the height of the layer of material at the particular location.

18. The printing device of claim 1, wherein multiple voxels correspond to an intended height of the material layer.

19. The printing device of claim 1, wherein the controller is further to determine densification of the layer of material at the various positions across the layer before and after selective solidification of the layer.

20. The printing device of claim 1, wherein the controller is to select more voxels for a position of the layer of material having a greater height.

\* \* \* \* \*